United States Patent
Escandell et al.

(10) Patent No.: US 8,127,746 B2
(45) Date of Patent: Mar. 6, 2012

(54) PRESSURE-CONTROLLING ELECTROMAGNETIC VALVE FOR DISTINCT ELECTROMAGNETIC AND HYDRAULIC UNITS

(75) Inventors: Gillian Escandell, Nice (FR); Gérard Garcia, Saint Laurent du Var (FR); Gérard Desaint, Carqueiranne (FR)

(73) Assignee: BorgWarner, Inc., Auburn Hills, MI (US)

( * ) Notice: Subject to any disclaimer, the term of this patent is extended or adjusted under 35 U.S.C. 154(b) by 578 days.

(21) Appl. No.: 11/989,900

(22) PCT Filed: Aug. 2, 2006

(86) PCT No.: PCT/FR2006/001873
§ 371 (c)(1),
(2), (4) Date: Jun. 1, 2009

(87) PCT Pub. No.: WO2007/015005
PCT Pub. Date: Feb. 8, 2007

(65) Prior Publication Data
US 2009/0293844 A1 Dec. 3, 2009

(30) Foreign Application Priority Data
Aug. 3, 2005 (FR) ...................................... 05 08289

(51) Int. Cl.
*F02M 59/36* (2006.01)
*F02M 59/20* (2006.01)
(52) U.S. Cl. ........................................ 123/458; 123/463
(58) Field of Classification Search .................. 123/458, 123/457, 456, 459, 461, 463; 251/129.15, 251/129.14; 137/625.65
See application file for complete search history.

(56) References Cited

U.S. PATENT DOCUMENTS

| 2002/0113219 | A1 | 8/2002 | Rembold et al. |
| 2004/0262557 | A1* | 12/2004 | Carrillo et al. ............ 251/129.14 |
| 2005/0000579 | A1* | 1/2005 | Burrola et al. ............ 137/625.65 |
| 2005/0092951 | A1 | 5/2005 | Groetzinger |
| 2006/0225797 | A1* | 10/2006 | Armiroli et al. ......... 137/625.65 |

FOREIGN PATENT DOCUMENTS

| DE | 22 62 925 | 6/1974 |
| DE | 102 00 915 | 10/2002 |
| WO | WO2005013024 | * 2/2005 |

* cited by examiner

*Primary Examiner* — Mahmoud Gimie
(74) *Attorney, Agent, or Firm* — Warn Partners, P.C.

(57) ABSTRACT

The pressure controlling electromagnetic valve comprises an electric sub-assembly (1) provided with a coil (3) and the yoke thereof (4) associated with a hydraulic sub-assembly (2) provided with a seat (7), which a conduit (9) connecting two high and low-pressure fluid circuits (10, 11), respectively, passes through, sealing means (8) of said conduit (9), a pusher (12) sliding in a pole piece (19) and actuating said sealing means (8), a movable core (13) which is connected to the pusher (12) and whose displacement is controlled by the coil (3), wherein said electric (1) and hydraulic (2) sub-assembly form two distinct unit blocks. Said blocks are rotatably mounted with respect to each other by assembling the hydraulic block (2) in the conduit, which passes through the electromagnetic block (1), a locking washer (23) is arranged on an end of the conduit for preventing any axial displacement of the hydraulic block (2) in one direction and a shoulder (27) is arranged on the other end of said conduit for preventing the displacement of said hydraulic bloc (2) in the other direction by contacting the limit stop (18) thereof and a elastic washer (26) is inserted between the shoulder (27) and the limit stop (18).

16 Claims, 1 Drawing Sheet

PRESSURE-CONTROLLING ELECTROMAGNETIC VALVE FOR DISTINCT ELECTROMAGNETIC AND HYDRAULIC UNITS

CROSS-REFERENCE TO RELATED

This application is a National Stage of International Application No. PCT/FR2006/001873, filed Aug. 2, 2006, which claims the priority of French Patent Application Serial No. FR 0508289, filed Aug. 3, 2005.

BACKGROUND OF THE INVENTION

The present invention relates to a pressure-regulating solenoid valve conventionally comprising an electrical subassembly provided with a coil and its yoke, associated with a hydraulic subassembly. The latter comprises mainly a seat through which a conduit passes linking two fluid circuits, respectively at high and low pressures, means of blocking said conduit, a push rod sliding in a pole piece and which operates these blocking means, and a moving core joined to the push rod the displacement of which is controlled by the coil.

SUMMARY OF THE INVENTION

These parts are, for example, used in direct fuel injection systems for common rail type heat engines, in which their function is to control the injection pressure: when the latter exceeds a predetermined threshold, fluid is discharged from the rail and returned to the fuel tank of the vehicle. They are in fact directly mounted on said common rail, inside which the fuel is carried at very high pressure using a high-pressure pump, in order to feed the injectors of the engine. For practical reasons, in particular connection reasons, these solenoid valves, or at least the part extending outside the common rail, need to be able to rotate. Hitherto, the way they were fixed to rotate in orifices in the common rail was to use a nut/lock nut system fixed to the internal threading of said orifice. Such a configuration has the drawback of organizing the rotation at a point that is potentially in contact with the fluid, in particular because it allows slippage at the lock nut level, which means that the bead that is assumed to provide the seal-tightness in the mechanical link enabling the rotation of the solenoid valve is open. On assembly, and above all in subsequent operation of the solenoid valve, particles can be mixed with the fuel, which are then likely to be deposited for example on the ball that is fitted in the plug of the solenoid valve, thus hampering the correct operation of the regulator.

The emission of particles can moreover be an obstacle to the correct operation of other elements of the common rail, such as, for example, the injectors, the piston of the pump, and so on. The mechanical plays provided for these parts to operate amount to a few microns, and their use can easily be disrupted by the existence of the microparticles carried by the fuel.

Moreover, in the configurations of the prior art, the electrical parts of the solenoid valve are in contact with the hydraulic circuit. In particular, plastic overmolded coils generate, on contact with the fuel, particles which can also, and in the same way, disrupt the operation of all the injection system. Now, as has been seen, the cleanliness of the fuel is a fundamental criterion, because of the extremely tight tolerances of the various mechanical parts: it is to this issue that the subject of the invention provides a contribution.

Thus, the regulating solenoid valve which is the subject thereof proposes a configuration in which the emission of particles is eliminated, or at least reduced in considerable proportions compared to the devices of the prior art.

This results notably from the fact that the electrical and hydraulic subassemblies form two separate unitary blocks. The separate nature of these two blocks means in particular that the electrical coil overmolded with a plastic material is no longer in contact with the fluid passing through the hydraulic subassembly. The independence of the hydraulic and electrical parts is also advantageous in terms of seal-tightness, which is in effect more simple to provide than in the devices of the prior art.

Moreover, the nut/lock nut assembly as it exists in the prior art is replaced by an assembly in which, according to the invention, the electrical subassembly is fixed to rotate directly on the hydraulic assembly. In other words, in the invention, the place of relative rotation is moved to a point where the mechanical links are scarcely likely to be in contact with the fuel. Finally, the new configuration of the link to the rail, which is set up only at the time of assembly, does not generate particles during operation. In the inventive configuration, said blocks are therefore mounted to rotate relative to each other, by assembly of the hydraulic block in a conduit passing through the electromagnetic block, a locking washer positioned at one end of the conduit preventing its axial displacement in one direction, and a shoulder located at the other end of said conduit preventing its axial displacement in the other direction by contact with an end stop of the hydraulic block. Also, a flexible washer is inserted between the shoulder and the end stop.

Each of the blocks is therefore envisaged as a separate component, fulfilling a purely electrical function in one case, and an exclusively hydraulic function in the other case, and enabling a relative rotation to be implemented which meets the previously stated requirements.

The locking washer, fixed to the hydraulic block and resting on the electromagnetic block, is positioned so that the flexible washer is compressed between said blocks.

Mainly, the axial maintenance pressure-wise is therefore provided by the locking washer. The degree of freedom rotation-wise which exists between the electrical subassembly and the hydraulic subassembly does not mean that one is totally free to rotate relative to the other. The compression of the flexible washer on the contrary makes it possible to control a rotation torque providing a positional stability of the solenoid valve extending beyond the common rail. This stability, besides its interest for operations involving connecting solenoid valves in real life, considerably reduces the spurious movements which can possibly create undesirable particles.

The locking washer is fixed to the hydraulic block by bracing, and comprises a flat surface of radial appearance resting on a shoulder of the conduit of the electromagnetic block.

According to one possibility, it includes a peripheral crown provided with an axially-oriented flat outer rim in contact with the internal wall of the conduit, inclined tabs extending from the radial flat surface toward the inside, the free ends of which are braced against the external wall of the hydraulic block.

Such washers, known per se, make it possible to adjust the rotation torque by modulating the axial force applied to the flexible washer when it is fitted. The friction that results from said axial force applied to the washer separating the electrical and hydraulic subassemblies makes it possible to avoid any easy rotation of the coil and is designed so as to allow forced rotation without destruction of the components and without generating particles in the hydraulic part. Also, preferably, the locking washer is made of steel.

To provide the particular function for which it is designed, the flexible washer is, for example, made of EPDM (ethylene propylene diene monomer). In the inventive configuration, the push rod and the axial core are capped by a cylindrical lid fixed in a seal-tight manner to the pole piece.

The fixing is provided for example by welding.

The capping ensures the separate nature of the hydraulic component, since it enables the fluid to remain contained in the chamber formed by this capping. The latter is no longer delimited, as was the case hitherto, by the electrical parts of the solenoid valve.

More specifically, the push rod and the moving core can be capped by a cap closing their free end opposite the seat, associated with a cylindrical sleeve hermetically fixed at one end to said cap and at the other end to the end stop of the hydraulic block, and to which the locking washer is applied.

It is therefore only the part situated in the conduit passing through the electromagnetic block which is capped. The capping stops at the end stop of the pole piece, that is, at the point where the flexible washer is inserted between the two respectively electrical and hydraulic blocks.

The capping also makes it possible to insert a spring between the radially-oriented end wall of the lid or of the cap and the moving core. This spring pushes back the blocking means of the solenoid valve in contact with their seat, making it possible to mechanically create a predetermined threshold value which generates a minimum pressure in the rail. In other words, with no electrical power supply, the solenoid valve generates a natural pressure ensuring a minimum pressurization of the common rail. With the spring bearing, at one of its ends, against the cap to which is applied the locking washer, the latter makes it possible, depending on its positioning and also on the setting of the force applied to the flexible washer, to adjust the return force exerted on the blocking means by compression of the spring.

According to one possible configuration, the blocking means consist of a ball stressed by the push rod toward the opening of the conduit passing through the seat.

This ball, positioned so as to block the conduit linking the two circuits respectively at high and low pressures, in particular by cooperation with the seat, cannot escape because of the shape given to said seat and the existence of the return force communicated to the push rod by the spring.

The end of the push rod designed to cooperate with the ball can include a part made of a material that is harder than that of the rest of the push rod.

The downstream outlet of the conduit of the seat, at the ball end, leads to at least one radial exhaust channel formed in the wall of the pole piece.

This exhaust channel is linked to the tank of the vehicle, and makes it possible to discharge fluid towards this tank when the plug of the solenoid valve opens.

The inventive regulating solenoid valve can be fixed in a wall of the common rail as follows: the pole piece includes, in the vicinity of the seat, beyond the exhaust channel or channels, a threading preceding a peripheral notch housing an O-ring seal. Compared to the prior art described previously, there is no longer a need for a nut or lock nut. The advantage, in terms of pollution by particles, lies in the fact that, after fitting, the mechanical link is no longer affected by the relative rotation of the electromagnetic block and of the hydraulic block.

The invention also encompasses an application of the above pressure-regulating solenoid valve, which corresponds to the preferred example used as the main theme of said description: the high-pressure circuit is that of an engine common rail, the low-pressure circuit is linked to the tank of the vehicle provided with said engine, and the fluid is fuel for the latter.

BRIEF DESCRIPTION OF THE DRAWINGS

The invention will now be described in more detail, with reference to the single appended FIGURE, FIG. 1, which represents a longitudinal cross-sectional view of a solenoid valve according to the invention.

DETAILED DESCRIPTION OF THE DRAWINGS

Figure 1:
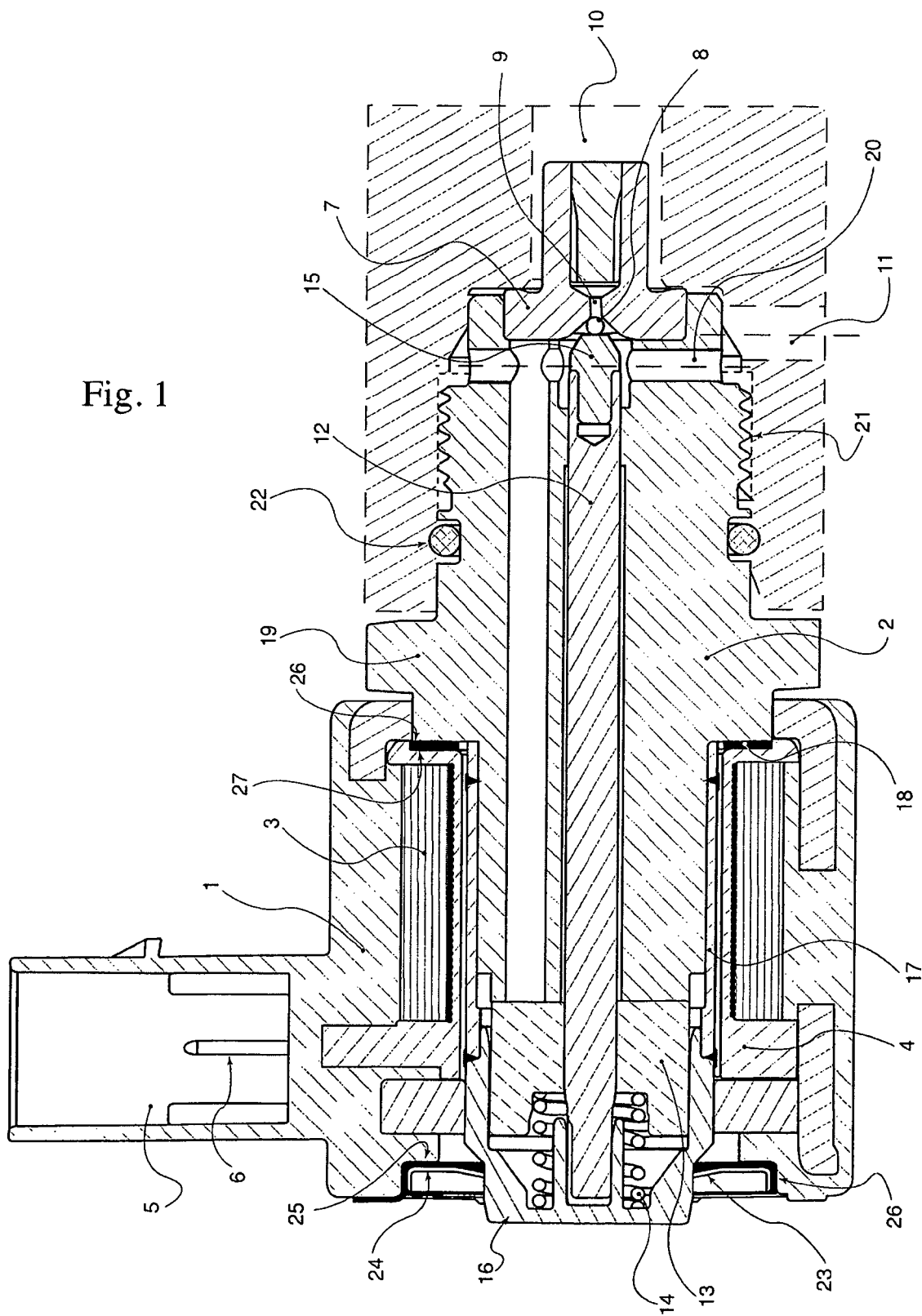

With reference to this FIGURE, the electromagnetic sub-assembly or block is referenced "1", and the hydraulic sub-assembly or block is referenced "2". The electromagnetic block "1" mainly comprises a coil (3) wound around a magnetic yoke (4), the assembly being overmolded. A connector (5) is provided to connect the solenoid valve using conductive rods (6).

The hydraulic block (2) comprises a seat (7) for a ball (8) making it possible to block the conduit (9) linking the high pressure part (10) of the hydraulic circuit to a low pressure part (11). The ball (8) is maintained in contact with the seat by a push rod (12) joined to the moving core (13) sliding inside the electromagnetic block (1). A spring (14) is used to exert a return force on the ball (8), establishing a minimum pressure threshold for the plug of the solenoid valve. At the end of the push rod (12) exerting an action on the ball (8), provision is made to join a part (15) made of harder material. The spring (14) bears, not only on the moving core (13), but on a cap (16) which seals the volume of the hydraulic block (2) in conjunction with a cylindrical sleeve (17), to which it is welded, and whose other end is fixed (for example also by welding) at the level of a shoulder (18) of a pole piece (19). It is in this pole piece (19) that the exhaust channels (20) are formed, making it possible to discharge the fluid, in the low pressure circuit (11), toward the fuel tank.

The hydraulic block (2) is provided with an external threading (21) for fixing to an internal threading provided in the orifice for connecting to the common rail. An O-ring seal (22) ensures seal-tightness with the outside.

A locking washer (23), made of stainless steel for example, ensures the axial fixing of the hydraulic block (2) in the electromagnetic block (1). This washer (23) is force-linked to the cap (16) by a link with bracing of its middle part, for example consisting of a certain number of tabs. The outer crown comprises a first surface (24) resting on a shoulder (25) of the electromagnetic block (1), and an axially-oriented peripheral rim (26) in contact with said electromagnetic block (1).

A flexible washer (26), made of EPDM for example, is inserted between the shoulder (18) of the pole piece (19) and a shoulder (27) of the electromagnetic block (1).

The locking washer (23) opposes any linear displacement of the hydraulic block (2) relative to the electromagnetic block (1), but does not oppose rotation between the two. Nor does the flexible washer (26) oppose it, but it creates, because of the friction, a torque which opposes said rotation. The value of this torque depends on the relative positioning between the locking washer (23) and the cap (16), that is, in fact, on the axial pressure that is imparted to it.

The existence of this flexible washer (26) makes it possible to avoid accidental rotation of the coil. It is, moreover, dimensioned so as to enable forced rotation, but without destructive friction of the components, and consequently without generating particles. The capping of the lefthand portion of the hydraulic block (2), using the sleeve (17) and the cap (16), provides for a total independence between the hydraulic circuit and the electromagnetic block (1), avoiding any transfer of any particles from the plastic overmolding of the coil (3) to the fluid.

All of these characteristics provide for a product offering particularly low pollution, in terms of microparticle generation. The design is therefore very advantageous in injection systems in which all the metallic parts are subject to very fine dimensioning tolerances which can be disrupted by said particles.

The invention claimed is:

1. A pressure-regulating solenoid valve comprising an electromagnetic subassembly provided with a coil and its yoke, associated with a hydraulic subassembly comprising a seat through which a conduit passes linking two fluid circuits, respectively at high and low pressures, means of blocking said conduit, a push rod sliding in a pole piece and operating said blocking means, a moving core joined to the push rod and the displacement of which is controlled by the coil, the electromagnetic and hydraulic subassemblies form two separate unitary blocks, characterized in that said blocks are mounted to rotate relative to each other by assembly, of the hydraulic block in a conduit passing through the electromagnetic block, a locking washer positioned at one end of the electromagnetic subassembly preventing any axial displacement of the hydraulic block in one direction and a shoulder located at the other end of said electromagnetic subassembly preventing any axial displacement in the other direction by contact with an end stop of the hydraulic block, a flexible washer being inserted between the electromagnetic subassembly shoulder and the end stop.

2. The pressure-regulating solenoid valve as claimed in claim 1, wherein that, the locking washer, fixed to the hydraulic block and resting on the electromagnetic block, is positioned so that the flexible washer is compressed between said blocks.

3. The pressure-regulating solenoid valve as claimed in claim 2, wherein that the locking washer is fixed to the hydraulic block by bracing, and comprises a flat surface of radial appearance resting on a shoulder of the conduit of the electromagnetic block.

4. The pressure-regulating solenoid valve as claimed in claim 1, wherein that the locking washer comprises a peripheral crown with an axially-oriented outer rim in contact with the internal wall of the conduit, and inclined tabs extending from the radial flat surface toward the inside, the free ends of which are braced against the external wall of the hydraulic block.

5. The pressure-regulating solenoid valve as claimed in claim 1, wherein that the Cocking washer is made of steel.

6. The pressure-regulating solenoid valve as claimed in claim 1, characterized in that the flexible washer is made of EPDM (ethylene propylene diene monomer).

7. The pressure-regulating solenoid valve as claimed in claim 1, wherein that the push rod and the moving core are capped by a cylindrical lid fixed in a seal-tight manner to the pole piece.

8. The pressure-regulating solenoid valve as claimed in claim 1, wherein that the push rod and the moving core are capped by a cap closing their free end opposite the seat, associated with a cylindrical sleeve hermetically fixed at one end to said cap and at the other end to the end stop of the hydraulic block, and to which the locking washer is applied.

9. The pressure-regulating solenoid valve as claimed in claim 7, wherein that a spring is inserted between the radially-oriented end wall of the lid or of the cap and the moving core.

10. The pressure-regulating solenoid valve as claimed in claim 1, characterized in that the blocking means consist of a ball stressed by the push rod towards the opening of the conduit passing through the seat.

11. The pressure-regulating solenoid valve as claimed in claim 1, wherein that the end of the push rod designed to cooperate with the ball includes a part made of a material that is harder than that of the rest of the push rod.

12. The pressure-regulating solenoid valve as claimed in claim 1, wherein that the downstream outlet of the conduit of the seat, at the ball end, leads to at least one radial exhaust channel formed in the wall of the pole piece.

13. The pressure-regulating solenoid valve as claimed in claim 1, wherein that the pole piece includes, in the vicinity of the seat and beyond the exhaust channel or channels, a threading preceding a peripheral notch housing an O-ring seal.

14. An application of the pressure-regulating solenoid valve as claimed in claim 1, wherein that the high-pressure circuit is that of an engine common rail, the low pressure circuit is linked to the tank of the vehicle provided with said engine, and the fluid is fuel for the latter.

15. A pressure-regulating solenoid valve comprising an electromagnetic subassembly provided with a coil and its yoke, associated with a hydraulic subassembly comprising a seat through which a conduit passes linking two fluid circuits, respectively at high and low pressures, means of blocking said conduit, a push rod sliding in a pole piece and operating said blocking means, a moving core joined to the push rod and the displacement of which is controlled by the coil, the electromagnetic and hydraulic subassemblies form two separate unitary blocks, characterized in that said blocks are mounted to rotate relative to each other by assembly of the hydraulic block in a conduit passing through the electromagnetic block, a locking washer positioned at one end of the conduit preventing any axial displacement of the hydraulic block in one direction and a shoulder located at the other end of said conduit preventing any axial displacement in the other direction by contact with an end stop of the hydraulic block, a flexible washer being inserted between the shoulder and the end stop; and wherein that the locking washer comprises a peripheral crown with an axially-oriented outer rim in contact with the internal wall of the conduit, and inclined tabs extending from the radial flat surface toward the inside, the free ends of which are braced against the external wall of the hydraulic block.

16. A pressure-regulating solenoid valve comprising an electromagnetic subassembly provided with a coil and its yoke, associated with a hydraulic subassembly comprising a seat through which a conduit passes linking two fluid circuits, respectively at high and low pressures, means of blocking said conduit, a push rod sliding in a pole piece and operating said blocking means, a moving core joined to the push rod and the displacement of which is controlled by the coil, the electromagnetic and hydraulic subassemblies form two separate unitary blocks, characterized in that said blocks are mounted to rotate relative to each other by assembly of the hydraulic block in a conduit passing through the coil, a locking washer positioned at one end of the electromagnetic subassembly preventing any axial displacement of the hydraulic block in one direction and a shoulder located at the other end of said electromagnetic subassembly preventing any axial displacement in the other direction by contact with an end stop of the hydraulic block, a flexible washer being inserted between the electromagnetic subassembly shoulder and the end stop.

* * * * *

UNITED STATES PATENT AND TRADEMARK OFFICE
CERTIFICATE OF CORRECTION

PATENT NO.        : 8,127,746 B2
APPLICATION NO.   : 11/989900
DATED             : March 6, 2012
INVENTOR(S)       : Gillian Escandell et al.

It is certified that error appears in the above-identified patent and that said Letters Patent is hereby corrected as shown below:

Column 5,
Line 47, Claim 5, "Cocking" should be -- locking --.

Signed and Sealed this
First Day of January, 2013

David J. Kappos
*Director of the United States Patent and Trademark Office*